United States Patent
Zhang et al.

(10) Patent No.: US 11,923,501 B2
(45) Date of Patent: Mar. 5, 2024

(54) SOLID-STATE NANOFIBER POLYMER MULTILAYER COMPOSITE ELECTROLYTES AND CELLS

(71) Applicant: UCHICAGO ARGONNE, LLC, Chicago, IL (US)

(72) Inventors: Yuepeng Zhang, Naperville, IL (US); Sanja Tepavcevic, Chicago, IL (US); Devon J. Powers, Lemont, IL (US); Peter Zapol, Hinsdale, IL (US); John N. Hryn, Hawthorn Woods, IL (US); Gregory K. Krumdick, Homer Glen, IL (US); Ozgenur Kahvecioglu, Naperville, IL (US); Krzystof Z. Pupek, Plainfield, IL (US); Michael John Counihan, Downers Grove, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 196 days.

(21) Appl. No.: 17/490,956

(22) Filed: Sep. 30, 2021

(65) Prior Publication Data
US 2023/0102140 A1    Mar. 30, 2023

(51) Int. Cl.
*H01M 10/056* (2010.01)
*H01M 4/02* (2006.01)
(Continued)

(52) U.S. Cl.
CPC .... *H01M 10/056* (2013.01); *H01M 2004/021* (2013.01); *H01M 2004/028* (2013.01);
(Continued)

(58) Field of Classification Search
CPC .... H01M 10/056; H01M 4/505; H01M 4/525; H01M 2004/021; H01M 2004/028; H01M 2300/0082; H01M 2300/0091
See application file for complete search history.

(56) References Cited

U.S. PATENT DOCUMENTS

| | | | |
|---|---|---|---|
| 2013/0230781 A1* | 9/2013 | Yu | H01M 4/5825 429/188 |
| 2018/0034112 A1* | 2/2018 | Goto | H01M 4/62 |

(Continued)

FOREIGN PATENT DOCUMENTS

| | | | |
|---|---|---|---|
| CN | 107316965 A | * | 11/2017 |
| CN | 112151859 A | * | 12/2020 |

(Continued)

OTHER PUBLICATIONS

Machine Translation of CN-107316965-A (Jul. 24, 2023) (Year: 2023).*

(Continued)

*Primary Examiner* — Matthew J Merkling
(74) *Attorney, Agent, or Firm* — Olson & Cepuritis, Ltd.

(57) ABSTRACT

A solid-state electrolyte for a multilayer solid-state electrochemical cell is described herein. The electrolyte comprises a lithium electrolyte salt and nanofibers of a cubic phase lithium lanthanum zirconium oxide (c-LLZO), and a polymer interspersed with the nanofibers and electrolyte salt. Electrochemical cells comprising the solid-state electrolyte, and solid-state cathodes comprising the nanofibers of c-LLZO are also described herein.

12 Claims, 5 Drawing Sheets

(51) Int. Cl.
H01M 4/505 (2010.01)
H01M 4/525 (2010.01)
(52) U.S. Cl.
CPC .......... H01M 4/505 (2013.01); H01M 4/525 (2013.01); H01M 2300/0077 (2013.01); H01M 2300/0082 (2013.01); H01M 2300/0091 (2013.01)

(56) References Cited

U.S. PATENT DOCUMENTS

| | | | |
|---|---|---|---|
| 2018/0254513 A1* | 9/2018 | Burdynska | H01M 4/50 |
| 2019/0051934 A1* | 2/2019 | Kim | H01M 10/052 |
| 2020/0112050 A1 | 4/2020 | Hu et al. | |

FOREIGN PATENT DOCUMENTS

| | | | | |
|---|---|---|---|---|
| CN | 112467199 A | * | 3/2021 | |
| CN | 113258127 A | * | 8/2021 | |

OTHER PUBLICATIONS

Machine Translation of CN-112151859-A (Jul. 24, 2023) (Year: 2023).*
Machine translation of CN-112467199-A (Jul. 26, 2023) (Year: 2023).*
Machine Translation of CN-113258127-A (Jul. 26, 2023) (Year: 2023).*
Ali, R.F. et al., Tuning The Surface Chemistry of Second-Harmonic-Active Lithium Niobate Nanoprobes Using A Silanol-Alcohol Condensation, Langmuir 37, 7689-7700 (2021).
Baade, P. et al., Ultra-High Throughput Manufacturing Method For Composite Solid-State Electrolytes, iScience 24, 102055, 1-20 (2021).
Barai, P. et al., Lithium Dendrite Growth Mechanisms In Polymer Electrolytes and Prevention Strategies, PCCP (Phys. Chem. Chem. Phys.) 19, 20493-20505 (2017).
Canepa, P. et al., Particle Morphology and Lithium Segregation to Surfaces of the Li7La3Zr2O12 Sollid Electrolyte, Chemistry of Materials 30, 3019-3027 (2018).
Chen, L. et al., PEO/Garnet Composite Electrolytes For Solid-State Lithium Batteries: From "Ceramic-in-Polymer" To "Polymer-in-Ceramic", Nano Energy 46, 176-184 (2018).
Chen, A. et al., Manufacturing Strategies for Solid Electrolyte in Batteries, Frontiers in Energy Research 8, 1-18 (2020).
Duan, H. et al., Extended Electrochemical Window of Solid Electrolytes via Heterogeneous Multilayered Structure for High-Voltage Lithium Metal Batteries, Advanced Materials 31, 1-7 (2019).
Fu, K.K. et al., Flexible, Solid-State, Ion-Conducting Membrane With 3D Garnet Nanofiber Networks For Lithium Batteries, PNAS 113 (26), 7094-7099 (2016).
Gupta, A. et al., Controlling Ionic Transport Through the PEO-LiTFSI/LLZTO Interface, The Electrochemical Society 28, 63-69 (2019).
Keller, M. et al., Electrochemical Performance of a Solvent-Free Hybrid Ceramic-Polymer Electrolyte Based on Li7La3Zr2O12 in P(EO)15LiTFSI, Journal of Power Sources 353, 287-297 (2017).
Aine, R.M. et al., Ring-Opening Polymerization of Epoxy End-Terminated Polyethylene Oxide (PEO) as a Route to Cross-Linked Materials with Exceptional Swelling Behavior, Macromolecules 37, 4525-4532 (2004).
Liang, J-Y et al., Engineering Janus Interfaces of Ceramic Electrolyte via Distinct Functional Polymers for Stable High-Voltage Li-Metal Batteries, Journal Of The American Chemical Society 141, 9165-9169 (2019).
LV, C. et al., 1D Nb-doped LiNi1/3Co1/3Mn1/3O2 Nanostructures as Excellent Cathodes for Li-Ion Battery, Electrochimica Acta 297, 258-266 (2019).
Porcarelli, L. et al., Super Soft All-Ethylene Oxide Polymer Electrolyte for Safe All-Solid Lithium Batteries, Scientific Reports 6, 19892, 1-14 (2016).
Sangeland, C. et al., Overcoming the Obstacle of Polymer-Polymer Resistances in Double Layer Solid Polymer Electrolytes, The Journal of Physical Chemistry Letters 12, 2809-2814 (2021).
Simon, F.J. et al., Interphase Formation of PEO20:LiTFSI-Li6PS5CI Composite Electrolytes with Lithium Metal, ACS Applied Materials & Interfaces 12, 11713-11723 (2020).
Wang, C. et al., Garnet-Type Solid-State Electrolytes: Materials, Interfaces, and Batteries, Chemical Reviews 120, 4257-4300 (2020).
Wang, M.J. et al., Enabling "Lithium-Free" Manufacturing of Pure Lithium Metal Solid-State Batteries Through In-Situ Plating, Nature Communications 11, 1-9 (2020).
Yang, T. et al., Composite Polymer Electrolytes with Li7La3Zr2O12 Garnet-Type Nanowires as Ceramic Fillers: Mechanism of Conductivity Enhancement and Role of Doping and Morphology, ACS Applied Materials & Interfaces 9, 21773-21780 (2017).
Yang, T. et al., Nanostructured Garnet-Type Solid Electrolytes for Lithium Batteries: Electrospinning Synthesis of Li7La3Zr2O12 Nanowires and Particle Size-Dependent Phase Transformation, The Journal of Physical Chemistry 119, 14947-14953 (2015).
Yu, X. et al., A Review of Composite Polymer-Ceramic Electrolytes for Lithium Batteries, Energy Storage Materials 34, 282-300 (2021).
Zhang, W. et al., Li7La3Zr2O12 Ceramic Nanofiber-Incorporated Solid Polymer Electrolytes for Flexible Lithium Batteries, ACS Applied Energy Materials 3, 5238-5246 (2020).
Zhu, Y. et al., Dopant-Dependent Stability of Garnet Solid Electrolyte Interfaces with Lithium Metal, Advanced Energy Materials 9, (1803440)1-11 (2019).

* cited by examiner

SOLID-STATE NANOFIBER POLYMER MULTILAYER COMPOSITE ELECTROLYTES AND CELLS

The United States Government has rights in this invention pursuant to Contract No. DE-AC02-06CH11357 between the United States Government and UChicago Argonne, LLC representing Argonne National Laboratory.

FIELD OF THE INVENTION

This invention relates to solid-state lithium electrochemical cells and batteries. This invention also relates to cathodes and solid-state electrolytes for the electrochemical cells and batteries.

BACKGROUND OF THE INVENTION

Solid-state battery technologies are projected to be a critical advance in the energy storage industry in order to enable deep decarbonization. This is due, at least in part to their potential for high energy densities, fast-charging, and improved safety. The global battery energy storage market is currently about $50B, and is projected to grow by an order of magnitude over the next 10-15 years. Solid-state battery technologies are anticipated to grow to as much as 50% market share over this same time frame. Making safe, strong, and stable solid-state electrolytes (SSEs) is essential for high density Li metal batteries.

Current solid-state lithium lanthanum zirconium oxide (LLZO) electrolytes utilize powdered ceramic particles. Typically, such powders are sintered at high temperatures (e.g., >1100° C.), which leads to high interfacial resistance, large grain size and facet grain morphology. This leads to relatively poor electrode electrolyte contact. Mechanical failures, such as cracks at facet-grain boundaries can cause fractures during cycling. In addition, these high temperature sintered LLZO powders typically show poor workability. It is important for the development of solid-state battery technology to create more refined composite ceramic-polymer electrolytes (CPEs) that can be synthesized in a real-world manufacturing process.

There is an ongoing need for highly conductive, solid-state electrolytes, electrochemical cells, and components thereof. The electrolytes, cells, and cathodes described herein address this need.

SUMMARY OF THE INVENTION

Solid-state lithium electrochemical cells (also referred to herein as solid-state batteries, for convenience), solid-state electrolytes for lithium batteries, and solid-state cathodes for lithium batteries are described herein, which contain ceramic lithium-conducting nanofibers. An integrated design of critical interfaces to improve CPE ionic conductivity and guide homogeneous ion distribution across both anode and cathode interfaces is described herein using LLZO-PEO composite thin films. The approach described herein focuses on the LLZO-PEO system, where nanofiber LLZO is utilized to improve ion transport and electrochemical stability. The LLZO intrinsic Li+ conductivity and nanowire morphology provides for superior CPE performance. In addition, un-doped c-LLZO can be utilized to avoid dopant segregation within the LLZO structures.

Solid-state electrolytes (also referred to as CPEs) useful for solid-state lithium electrochemical cells are described herein. The solid-state electrolyte comprises a lithium electrolyte salt (e.g., lithium bis(trifluoromethanesulfonyl) imidate), at least about 55 percent by weight (wt %) nanofibers of a cubic phase lithium lanthanum zirconium oxide (c-LLZO; e.g., Al-doped c-LLZO), preferably at least about 55 wt % c-LLZO nanofibers, and a polymer (e.g., poly (ethylene oxide); PEO) interspersed with the nanofibers and electrolyte salt; wherein the nanofibers are interconnected in a three-dimensional network. As used herein, the wt % of a specified material in a specified layer defined as 100 times the weight of the specified material divided by the total weight of all materials in the layer. In some embodiments, the electrolyte further comprises a first interfacial polymer layer (e.g., PEO) on one surface thereof; and a second interfacial polymer layer (e.g., polyacrylonitrile) on a second surface thereof. Typically, the nanofibers of the c-LLZO have a fiber diameter in the range of about 100 to about 10,000 nm (e.g., about 100 nm to about 1,500 nm). The lithium salt is present in the electrolyte in a polymer to $Li^+$ ratio of about 5:1 to 30:1 based on moles of polymer monomer units (e.g., ethylene oxide (EO) in the case of PEO as the polymer) and of $Li^+$. The nanofibers provide Li-ion transport channels to enable fast-charging capabilities.

In some embodiments, the nanofibers of the electrolyte can be fixed or immobilized with respect to the polymer by e.g., covalently bonding the nanofibers to the polymer, forming the polymer in situ in the presence of the nanofibers and the salt to form the polymer chains around the nanofibers, or crosslinking the polymer in situ in the presence of the nanofibers and the salt.

A solid-state electrochemical cell also is described herein. The unique cell design described herein includes an electrochemically stable LLZO fiber-PEO composite electrolyte, and a highly ion-conductive and mechanically robust dual nanofiber composite cathode that includes nanofibers of a cathode active material (e.g., NMC) along with nanofibers of c-LLZO, in addition to powders and/or particles of cathode active materials (e.g., the NMC powders or particles in the case of NMC cathodes of lithium ion batteries). In addition, un-doped c-LLZO can be utilized to avoid dopant segregation within the LLZO structure. Some embodiments also include an ultrathin Li metal anode formed in situ through cathode delithiation, and/or ultrathin polymeric electrode-electrolyte interfacial layers. In such embodiments, incorporation of nanofibers in the electrolyte and cathode, paired with a thin, pure Li metal anode, will provide high charge rates (10 C), outstanding energy densities, and good durability. The electrochemical cells described herein will provide the advanced performance needed for increased EV market adoption of sold state batteries.

In some embodiments, the electrochemical cell comprises a multilayer sheet in the following layer order in the direction from anode to cathode: (a) an anode current collector layer; (b) an anode comprising an anode active material (e.g., metallic lithium); (c) a solid-state electrolyte layer comprising at least about 55 wt % nanofibers of a first cubic phase lithium lanthanum zirconium oxide (c-LLZO), a lithium salt (e.g., lithium bis(trifluoromethanesulfonyl)imidate (LiTFSI)), and a first polymer (e.g., polyethylene oxide (PEO)) interspersed with the nanofibers and electrolyte salt; (d) a cathode layer comprising a cathode active material dispersed in a second polymer; and (e) a cathode current collector layer; wherein adjacent layers in the sheet contact each other and adhere together to form the solid-state electrochemical cell. The lithium salt is present in the electrolyte in a polymer to $Li^+$ ratio of about 5:1 to 30:1 based on moles of polymer monomer units and of $Li^+$. For example, when the polymer is PEO, the polymer to lithium ratio is the ratio of the moles of ethylene oxide (EO) units in the polymer to the moles of lithium ion in the lithium salt component. In some embodiments, interfacial polymer layers are included between the electrolyte and the anode, and/or between the electrolyte and the cathode, e.g., to inhibit undesired reactions between the electrolyte components and the anode and/or cathode.

In some embodiments, the cathode layer comprises nanofibers of a cathode active metal oxide (e.g., nanofibers of a layered lithium nickel manganese cobalt oxide (NMC), such as $LiNi_xMn_yCo_zO_2$ (NMC) wherein x+y+z=1, 0<x<1, 0<y<1, and 0<z<1), nano- or micrometer powders or particles of the cathode active metal oxide (e.g., nanofibers of a layered lithium nickel manganese cobalt oxide (NMC), such as $LiNi_xMn_yCo_zO_2$ (NMC) wherein x+y+z=1, 0<x<1, 0<y<1, and 0<z<1), and nanofibers of a second c-LLZO (e.g., a cubic phase Al-doped LLZO), all of which are dispersed in or bound together by a second polymer (e.g., PEO), along with other functional components such as a particulate carbon material (e.g., carbon black, graphite, graphene, and the like).

In some embodiments, the position of nanofibers in the electrolyte is fixed e.g., by covalent bonding of LLZO to polymer, cross-linking the polymer in situ, or forming a branched polymer in situ, thus avoiding any severe agglomeration and phase separation.

Nanofiber-based c-LLZO is made by electrospinning a precursor composition comprising $Li^+$, $La^{2+}$, and $Zr^{2+}$ ions, and a binding polymer to form a three-dimensional network of interconnected precursor fibers, and then sintering the precursor fibers at a relatively low sintering temperature (e.g., 600 to 800° C.). This process produces nanocrystalline cubic phase grains that stabilize high ion-conductivity c-LLZO. The resulting c-LLZO nanofibers retains the three-dimensional structure of the precursor fibers, which creates a long-range ion transport pathway. This facilitates fast charging, with fewer mechanical fractures compared to sintered LLZO powder. Surprisingly, the c-LLZO nanofibers described herein can be utilized in the solid-state electrolyte in high concentration (e.g., 55 wt % or greater), such that the first polymer can be considered as a binder to hold the nanofibers and electrolyte salt together. In addition, the solid-state electrolyte has a non-woven nanofiber structure that is compatible with roll-to-roll manufacturing techniques.

The electrochemical cells described herein are fast charging, high energy-density solid-state lithium-based cells with an innovative multilayer composite cell design. In some embodiments, the cathode layer of the cells includes novel incorporation of both c-LLZO and cathode active metal-oxide (e.g., lithium nickel-manganese-cobalt oxide; "NMC") nanofibers within the cathode composition, together with cathode active metal-oxide powders/particles (e.g., lithium nickel-manganese-cobalt oxide; "NMC"), which enhances interparticle connectivity and cathode electronic and ionic conductivity. Cathode active nanofibers can be synthesized using a method similar to that used for LLZO nanofibers. In some embodiments, the cells described herein represent an important advance for polymer-oxide composite-based solid-state battery technologies, where incorporating the c-LLZO nanofibers in the electrolyte and in the cathode provides continuous Li-ion transport channels to enable fast-charging capabilities.

In some embodiments, Li-rich NMC622 or NMC811 powders are used in the cathode for in situ creation of a thin Li metal anode through electrochemical delithiation of the cathode. This is useful for interfacial contact resistance reduction and energy density improvement. Alternatively, a thin Li anode film can be created using ultra-high vacuum (UHV) to form a thin layer of lithium metal via e-beam deposition.

In some embodiments, it may be desirable to increase contact between the LLZO and/or NMC nanofibers with NMC powders in the cathode, in order to reduce the contribution of the powders to the ionic conductivity.

Various embodiments of the cell design described herein have a number of innovative features including, e.g.:

LLZO nanofiber-polymer composite used as solid-state electrolyte facilitates homogenous Li-ion flux distribution at the electrolyte/lithium interface and good wettability of polymer, which prevents dendrite growth.

LLZO nanofibers and polymers in the composite electrolytes are bonded or immobilized with specific bonding or polymer cross-linking methods, which can significantly reduce interfacial resistance between nanofibers and polymers as well as can avoid mechanical crack at the fiber-polymer interface.

In situ electrochemical formation of ultrathin Li metal anode through Li-rich NMC cathode delithiation, which reduces anode thickness and improves anode/electrolyte interface.

Composite LLZO-NMC double fiber-NMC powder cathode enhances interparticle connectivity and cathode electronic and ionic conductivity.

The LLZO nanofibers in the electrolyte and electrode serve as continuous Li-ion transport channels, improving charge/discharge rates.

Ultrathin polymer interfacial layers between the electrolyte and the electrodes minimizes reactions between electrolyte and electrodes.

The following non-limiting embodiments are set forth below to highlight certain features and aspects of the membranes described herein.

Embodiment 1 is a solid-state electrolyte for a multilayer solid-state electrochemical cell; the electrolyte comprising: a lithium electrolyte salt, at least about 55 wt % nanofibers of a cubic phase lithium lanthanum zirconium oxide (c-LLZO), and a polymer interspersed with the nanofibers and electrolyte salt; wherein the nanofibers are interconnected in a three-dimensional network, and the lithium salt is present in a ratio of the polymer to $Li^+$ of about 5:1 to 30:1 based on moles of polymer monomer units and of $Li^+$.

Embodiment 2 is the electrolyte of embodiment 1, wherein the c-LLZO is selected from the group consisting of an Al-doped cubic phase $Li_7La_3Zr_2O_{12}$, undoped cubic phase $Li_7La_3Zr_2O_{12}$, Ti-doped $Li_7La_3Zr_2O_{12}$, and Ga-doped $Li_7La_3Zr_2O_{12}$.

Embodiment 3 is the electrolyte of embodiment 1 or embodiment 2, wherein the lithium electrolyte salt is selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, and combinations of two or more thereof.

Embodiment 4 is the electrolyte of any one of embodiments 1 to 3, wherein the polymer is selected from the group consisting of polyethylene oxide (PEO), polyvinylidene fluoride (PVDF), poly(methyl methacrylate) (PMMA), polycarbonate (PC), polyacrylonitrile (PAN), and carboxymethylcellulose (CMC).

Embodiment 5 is the electrolyte of any one of embodiments 1 to 4, further comprising a first interfacial polymer layer on one surface thereof; and a second interfacial polymer layer on a second surface thereof.

Embodiment 6 is the electrolyte of any one of embodiments 1 to 5, wherein the first interfacial polymer layer comprises PEO and the second interfacial polymer layer comprises PAN.

Embodiment 7 is the electrolyte of any one of embodiments 1 to 6, wherein the nanofibers of the c-LLZO are covalently bonded to the polymer.

Embodiment 8 is the electrolyte of any one of embodiments 1 to 6, wherein the polymer is formed in situ by polymerization of one or more monomers in the presence of the nanofibers of the c-LLZO.

Embodiment 9 is the electrolyte of any one of embodiments 1 to 6, wherein the polymer is cross-linked in situ by adding a cross-linking agent to the polymer in the presence of the nanofibers of the c-LLZO and initiating a cross-linking reaction.

Embodiment 10 is the electrolyte of any one of embodiments 1 to 9, wherein the nanofibers of the c-LLZO have a fiber diameter in the range of about 100 nm to about 10,000 nm (e.g., about 100 nm to about 1,500 nm).

Embodiment 11 is a multilayer solid-state electrochemical cell comprising a multilayer sheet in the following layer order, in the direction from anode to cathode:
(a) an anode current collector layer;
(b) an anode layer comprising an anode active material;
(c) a solid-state electrolyte layer comprising a lithium electrolyte salt, at least about 55 wt % nanofibers of a first cubic phase lithium lanthanum zirconium oxide (c-LLZO), and a first polymer interspersed with the nanofibers and electrolyte salt; wherein the nanofibers of the first c-LLZO are interconnected in a three-dimensional network, and the lithium salt is present in a ratio of the polymer to Li$^+$ of about 5:1 to 30:1 based on moles of polymer monomer units and of Li$^+$;
(d) a cathode layer comprising a cathode active material dispersed in a second polymer; and
(e) a cathode current collector layer;
wherein adjacent layers in the sheet contact each other and adhere together to form the solid-state electrochemical cell.

Embodiment 12 is the electrochemical cell of embodiment 11, wherein the first c-LLZO is selected from the group consisting of an Al-doped cubic phase $Li_7La_3Zr_2O_{12}$, undoped cubic phase $Li_7La_3Zr_2O_{12}$, Ta-doped $Li_7La_3Zr_2O_{12}$, and Ga-doped $Li_7La_3Zr_2O_{12}$.

Embodiment 13 is the electrochemical cell of embodiment 11 or embodiment 12, wherein the cathode layer further comprises nanofibers of a second c-LLZO dispersed in the second polymer, and at least a portion of the cathode active material is in the form of nanofibers.

Embodiment 14 is the electrochemical cell of any one of embodiments 11 to 13, wherein at least a portion of the cathode active material is in the form of particles.

Embodiment 15 is the electrochemical cell of any one of embodiments 11 to 14, wherein the second c-LLZO is selected from the group consisting of an Al-doped cubic phase $Li_7La_3Zr_2O_{12}$, undoped cubic phase $Li_7La_3Zr_2O_{12}$, Ta-doped $Li_7La_3Zr_2O_{12}$, and Ga-doped $Li_7La_3Zr_2O_{12}$.

Embodiment 16 is the electrochemical cell of any one of embodiments 11 to 15, wherein the lithium electrolyte salt is selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, and combinations of two or more thereof.

Embodiment 17 is the electrochemical cell of any one of embodiments 11 to 13, wherein the first polymer is selected from the group consisting of polyethylene oxide (PEO), polyvinylidene fluoride (PVDF), poly(methyl methacrylate) (PMMA), polycarbonate (PC), polyacrylonitrile (PAN), and carboxymethylcellulose (CMC); and the second polymer is selected from the group consisting of PAN, PVDF, PMMA, and CMC.

Embodiment 18 is the electrochemical cell of any one of embodiments 11 to 13, wherein the cathode active material is selected from the group consisting of (a) LiNi$_x$Mn$_y$Co$_z$O$_2$ (NMC) wherein x+y+z=1, 0<x<1, 0<y<1, and 0<z<1, (b) LiNi$_{0.5}$Mn$_{1.5}$O$_4$ (LNMO), (c) LiMn$_2$O$_4$ (LMO), (d) LiFePO$_4$ (LFP), (e) lithium nickel cobalt aluminum oxide (NCA), (f) lithium nickel manganese aluminum oxide, (g) lithium cobalt oxide (LCO), (h) Li$_3$V$_2$(PO$_4$)$_3$, and (i) Li—S.

Embodiment 19 is the electrochemical cell of any one of embodiments 11 to 18, wherein, further comprising a first interfacial polymer layer between the anode layer and the solid-state electrolyte layer; and a second interfacial polymer layer between the solid-state electrolyte layer and the cathode layer.

Embodiment 20 is the electrochemical cell of embodiment 19, wherein the first interfacial polymer layer comprises PEO and the second interfacial polymer layer comprises PAN.

Embodiment 21 is the electrochemical cell of any one of embodiments 11 to 20, wherein the anode current collector layer comprises a copper foil or a carbon material selected from the group consisting of carbon nanofibers, graphite sheets, carbon paper, carbon nanotubes, and graphene; and the cathode current collector layer comprises an aluminum foil or a carbon material selected from the group consisting of carbon nanofibers, graphite sheets, carbon paper, carbon nanotubes, and graphene.

Embodiment 22 is the electrochemical cell of any one of embodiments 11 to 21, wherein the nanofibers of the first c-LLZO have a fiber diameter in the range of about 100 nm to about 10,000 nm (e.g., about 100 nm to about 1,500 nm).

Embodiment 23 is the electrochemical cell of any one of embodiments 11 to 22, wherein the cathode comprises nanofibers of the cathode active material; nanofibers of a second c-LLZO; particles of the cathode active material; and particles of a carbon material such as carbon particles, graphite nanostructures, graphene, and the like; all of which are dispersed in a polymeric matrix.

Embodiment 24 is a cathode for a multilayer solid-state electrochemical cell; the cathode comprising: nanofibers of a cathode active material; nanofibers of a cubic phase lithium lanthanum zirconium oxide (c-LLZO); particles of the cathode active material; and particles of a carbon material such as carbon particles, graphite nanostructures, graphene, and the like; all of which are dispersed in a polymeric matrix; wherein the nanofibers of the c-LLZO are interconnected in a three-dimensional network.

Embodiment 25 is the cathode of embodiment 24, wherein the c-LLZO is selected from the group consisting of an Al-doped cubic phase $Li_7La_3Zr_2O_{12}$, undoped cubic phase $Li_7La_3Zr_2O_{12}$, Ta-doped $Li_7La_3Zr_2O_{12}$, and Ga-doped $Li_7La_3Zr_2O_{12}$.

Embodiment 26 is the cathode of embodiment 24 or embodiment 25, wherein the cathode active material is selected from the group consisting of (a) $LiNi_xMn_yCo_zO_2$ (NMC) wherein x+y+z=1, 0<x<1, 0<y<1, and 0<z<1, (b) $LiNi_{0.5}Mn_{1.5}O_4$ (LNMO), (c) $LiMn_2O_4$ (LMO), (d) $LiFePO_4$ (LFP), (e) lithium nickel cobalt aluminum oxide (NCA), (f) lithium nickel manganese aluminum oxide, (g) lithium cobalt oxide (LCO), (h) $Li_3V_2(PO_4)_3$, and (i) Li—S.

Embodiment 27 is the cathode of any one of embodiments 24 to 26, wherein the polymeric matrix is selected from the group consisting of polyacrylonitrile (PAN), polyvinylidene fluoride (PVDF), and carboxymethylcellulose (CMC).

Embodiment 28 is the cathode of any one of embodiments 24 to 27, wherein the nanofibers of the cathode active material have a fiber diameter in the range of about 100 nm to about 1500 nm.

Embodiment 29 is the cathode of any one of embodiments 24 to 28, wherein the nanofibers of the c-LLZO have a fiber diameter in the range of about 100 nm to about 1500 nm.

Embodiment 30 is the cathode of any one of embodiments 24 to 29, wherein the nanofibers of c-LLZO are substantially evenly dispersed through the cathode, and the nanofibers of the cathode active material are asymmetrically dispersed within the cathode such that the concentration of the cathode active material is higher near one surface of the cathode and lower at an opposite surface of the cathode.

Embodiment 31 is the electrochemical cell of any one of embodiments 11 to 23 wherein the cathode layer comprises the cathode of any one of embodiments 24 to 30.

Embodiment 32 is the electrochemical cell of any one of embodiments 11 to 23 and 31 wherein the electrolyte layer comprises the electrolyte of any one of embodiments 1 to 10.

The methods and materials described herein comprise certain novel features hereinafter fully described, which are illustrated in the accompanying drawings and the following description, and which are particularly pointed out in the appended claims. It is to be understood that various changes in the details may be made without departing from the spirit, or sacrificing any of the advantages of the systems, electrochemical reactors, and methods described herein.

DETAILED DESCRIPTION OF THE PRESENT INVENTION

Lithium conductive nanofiber cubic phase LLZO provides unique advantages for use in solid-state electrolytes, cathodes, and lithium electrochemical cells. The solid-state electrolyte comprises a lithium electrolyte salt and a high-loading (e.g., ≥55 or 60 wt %) nanofibers of c-LLZO), mixed with polymer (e.g., poly(ethylene oxide); PEO), which acts as a binder for the salt and nanofibers. The nanofibers can be fabricated by electrospinning, electrospray, melt blown, melt spinning, solution blow spinning, and any other nanofiber fabrication method In some embodiments, the nanofibers are made by electrospinning techniques from lithium, zirconium, lanthanum salts and a polymeric binder (e.g., PVP), which produces nanofibers of the polymer/precursor mixture. The polymer/LLZO precursor fibers are then annealed or sintered at a temperature in the range of about 600 to 800° C. to form c-LLZO nanofibers in an interconnected three-dimensional network.

In some embodiments, the electrolyte further comprises a first interfacial polymer layer (e.g., PEO) on one surface thereof; and a second interfacial polymer layer (e.g., polyacrylonitrile) on a second surface thereof. To avoid clumping or uneven distribution of the nanofibers and polymer in the electrolyte, the nanofibers can be fixed with respect to the polymer by covalently bonding, forming the polymer in situ in the presence of the nanofibers and the salt, or crosslinking the polymer in situ in the presence of the nanofibers and the salt.

In some embodiments, the position of nanofibers in the electrolyte is fixed or immobilized to avoid any severe agglomeration and phase separation. For example, the nanofibers can be fixed or immobilized by covalent bonding of LLZO to polymer, cross-linking the polymer in situ, or forming a branched polymer in situ.

Covalent bonding of the LLZO to the polymer can be achieved using a polymer comprising a functional group that can react with LLZO to form a covalent bond. For example, covalent linking of short PEO chains to the ceramic oxide surface can be accomplished by straightforward silane-based condensation reactions, e.g., as described in Ali, R. F.; Guo, I.; Kang, H.; Radford, M. J.; Yapp, D. T.; Gates, B. D. *Langmuir* 2021, 37 (25), 7689-7700, which is incorporated herein by reference in its entirety. This creates a monolayer of short oligomers on the LLZO surface that can mix well with the surrounding longer-chain PEO matrix. These surface layers should also provide protection against reaction of LLZO with $CO_2$ and $H_2O$ in air.

The nanofibers also can be immobilized by mixing the nanofibers with a polymerizable monomer (e.g., PEO-acrylate esters), and a catalyst or initiator, if needed, and then polymerizing the monomer to form the polymer in situ. In this way, polymer chains can form around the nanofibers to hold them in place. Methods of forming polymers from monomers are well known in the polymer art. The in situ polymerization can also provide cross-links within the resulting polymer.

The nanofibers also can be immobilized by adding a cross-linking agent to the mixture of nanofibers and polymer, to cross-link the polymer in situ, so that at least some of the polymer chains will be cross-linked around the nanofibers. If desired, the polymer can include appended cross-linkable functional groups to aid in the cross-linking process. In some cases, heat or UV light can be utilized to activate radical species to cross-link PEO, such as described in Duan, H.; Fan, M.; Chen, W.-P.; Li, J.-Y.; Wang, P.-F.; Wang, W.-P.; Shi, J.-L.; Yin, Y.-X.; Wan, L.-J.; Guo, Y.-G. *Adv. Mater.* 2019, 31 (12), 1807789; and Porcarelli, L.; Gerbaldi, C.; Bella, F.; Nair, J. R. *Sci. Rep.* 2016, 6, 19892, each of which is incorporated herein by reference in its entirety. Additionally, crosslinking and increased ceramic-polymer adhesion increases the mechanical strength of the composite membranes, which can ameliorate fragility caused by high LLZO loading and further aid in preventing dendrite growth. Methods of cross-linking many different types of polymers are well known in the polymer art.

A solid-state electrochemical cell described herein comprises a multilayer sheet in the following layer order in the direction from anode to cathode: (a) an anode current collector layer; (b) an anode comprising an anode active material; (c) a solid-state electrolyte layer comprising at least about 55 wt % nanofibers of a first cubic phase lithium lanthanum zirconium oxide (c-LLZO), a lithium electrolyte salt, and a first polymer interspersed with the nanofibers and electrolyte salt; and the lithium salt is present in a ratio of the polymer to $Li^+$ of about 5:1 to 30:1, based on moles of polymer monomer units and $Li^+$; (d) a cathode layer comprising a cathode active material dispersed in a second polymer; and (e) a cathode current collector layer; wherein adjacent layers in the sheet contact each other and adhere together to form the solid-state electrochemical cell. Preferably the interface between the anode and the electrolyte is substantially free of c-LLZO, in order to avoid undesirable lithium dendrite formation between the electrolyte and the anode. Thus, in some preferred embodiments, an interfacial polymer layer is included between the electrolyte and the anode. In addition, use of higher voltage cathode materials such as NMC can result in parasitic interfacial reactions at the cathode, thus it is also preferable to include a thin polymer (e.g., PAN) interfacial layer between the electrolyte layer and the cathode layer to inhibit such reactions.

The polymer component of the solid-state electrolyte can be, e.g., PEO, PVDF, PMMA, PC, PAN, CMC, and the like. The polymer component of the cathode layer can be, e.g., PAN, PVDF, CMC, PMMA, and the like. In some embodiments, the polymers (e.g., PEO, PAN, and the like) have a number average molecular weight in the range of about 20 to about 1,500 kDa, e.g., about 600 to about 1,000 kDa.

As used herein the term "lithium battery" refers to electrically connected combinations of electrochemical cells in which lithium (e.g., lithium ion) shuttles between an anode and a cathode, and includes so-called full cells, as well as so-called half-cells (e.g. comprising a lithium metal anode). For convenience, the term "lithium battery" and grammatical variations thereof also are used collectively to refer to both electrochemical cells and electrically connected combinations of electrochemical cells in a general manner. There term "solid-state" is used herein to refer to a material that is not liquid, and includes rigid solid materials, flexible solid materials, and gels.

Figure 8:
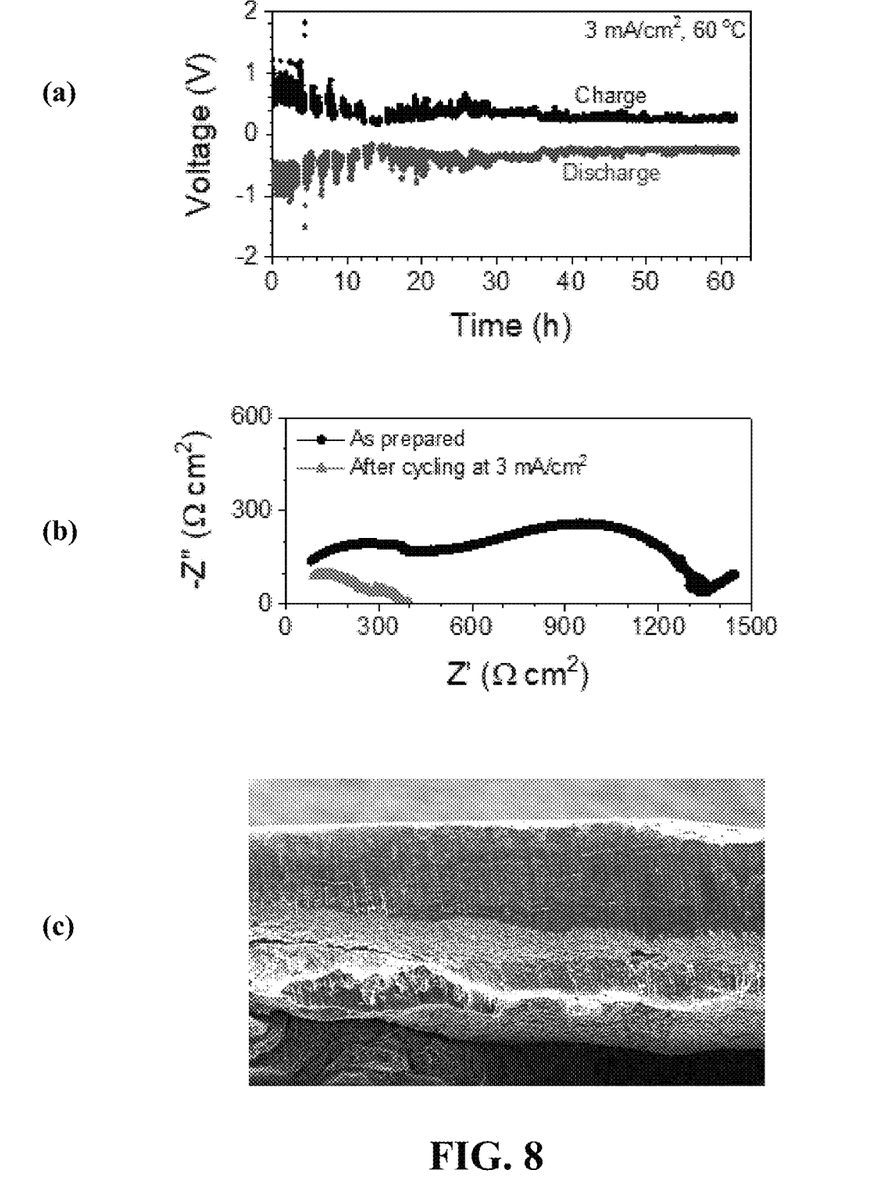
FIG. 8 provides graphs of cell cycling data for a symmetric cell comprising layers of lithium coated onto both surfaces of a solid-state electrolyte comprising Al-doped LLZO nanofibers and LiTFSI electrolyte salt in a PEO polymer matrix; Panel (a) shows a plot of voltage versus time for charge-discharge cycling of the cell; and Panel (b) shows an AC impedance spectrogram; and Panel (c) shows a cross-section SEM image after cycling.

The electrolyte can be formed by combining a mixture of the active materials, such as LLZO nanofibers and a lithium salt with a polymeric matrix such as PAN, PEO, or PMMA. Optionally a solvent (e.g., acetonitrile) can be included with the components of the electrolyte to aid in dissolving or dispersing the components into a substantially homogeneous mixture. The resulting mixture is coated (e.g., slot-die coated) to form a sheet of solid-state electrolyte material on a moving web and optionally dried to remove solvent and form an electrolyte sheet or film on the web. The electrolyte sheet is removed from the web and then subjected to further processing (e.g., depositing a Li layer on the electrolyte sheet, laminating with a cathode sheet, and the like). Slot-die coating provides good film density and nanofiber spatial distribution, as well as precisely controlled film thickness (e.g., 50 to 100 μm). Multilayer coating allows for microstructure adjustment as well as process integration with cathode material synthesis. FIG. 8, Panel B, shows electron micrographs of a slot-die coated electrolyte film with a relatively uniform 80 μm thickness.

Cathodes can be formed by combining a mixture of the active materials, such as cathode active nanofibers, LLZO nanofibers, cathode active particles, and optionally some form of particulate carbon (e.g., particles of a carbon material such as carbon black, graphite, or activated carbon, graphite nanostructures, graphene, and the like) with a polymeric matrix such as PAN, PEO, or PMMA. Optionally a solvent (e.g., acetonitrile) can be included with the components of the cathode to aid in dissolving or dispersing the components into a substantially homogeneous mixture for coating. The resulting mixture can be coated on a conductive current collector (e.g., aluminum foil) and optionally dried to remove solvent and form a cathode active layer on the current collector, and the resulting structure can be laminated to another multilayer structure comprising, e.g., the electrolyte layer and the interfacial layers, the anode and the anode current collector. Alternatively, the cathode layer can be coated onto the solid-state electrolyte and PAN interfacial layer using extrusion or roll coating processes. Including c-LLZO nanofibers along with nanofibers of a cathode active material such as NMC enhances interparticle connectivity and ionic conductivity of the cell, as well as improves mechanical strength of cathodes and contacts between cathode and electrolyte. LLZO fibers in the electrolyte and the cathode also serve a continuous Li-ion transport channels, improving the charge/discharge rate.

In some embodiments, a Li anode layer can be formed in situ between the PEO interfacial layer and the anode current collector by electrochemically delithiating a lithium-rich NMC material in the cathode layer. This can reduce the anode thickness and improve the anode/electrolyte interface.

Some examples of electrode active materials that can be included in the cells and batteries described herein can be found, e.g., in Mekonnen, Y., Sundararajan, A. & Sarwat, A. I. "A review of cathode and anode materials for lithium-ion batteries," *SoutheastCon* 2016, Norfolk, VA, pp. 1-6, (2016), which is incorporated herein by reference in its entirety. It is well understood that the function of a given electrode switches from being a positive or negative electrode depending on whether the electrochemical cell is discharging or charging. Nonetheless, for the sake of convenient identification, the terms "cathode" and "anode" as used herein are applied as identifiers for a particular electrode based only on its function during discharge of the electrochemical cell.

The cathode active material typically is a lithium metal oxide material. In some embodiments, cathode active materials that can be utilized in the cathode layer include, e.g., a layered lithium metal oxide cathode material such as $LiMO_2$ wherein M=Mn, Ni, Co or a combination thereof. Nonlimiting examples of layered lithium metal oxides include, e.g., a layered lithium nickel-manganese-cobalt oxide of formula $LiNi_xMn_yCo_zO_2$ (NMC) wherein x+y+z=1, 0<x<1, 0<y<1, and 0<z<1, often referred to as "NMC", such as $LiNi_{0.5}Mn_{0.3}CO_{0.2}O_2$ (also known as "NMC532"), $LiNi_{0.6}Mn_{0.2}CO_{0.2}O_2$ (also known as "NMC622"), $LiNi_{0.8}Mn_{0.1}CO_{0.1}O_2$ (also known as "NMC811"), and similar materials; and layered $LiCoO_2$.

In other embodiments, the cathode can comprise a spinel lithium metal oxide (e.g., $LiMn_2O_4$, $LiMn_2O_4$, $Li_2Mn_4O_9$, $Li_4Mn_5O_{12}$, $LiV_2O_4$, $LiFe_5O_8$, $Li_4Ti_5O_{12}$, and related materials), a lithiated spinel lithium metal oxide such as $Li_2M'_2O_4$ wherein M'=Mn, Ni, Co or a combination thereof; lithium iron phosphate; a structurally integrated 'layered-layered' (LL) lithium metal oxide such as $xLi_2MnO_3 \cdot (1-x)LiMn_yM_{1-y}O_2$ wherein 0<x<1, 0≤y≤1, M=Ni, Co, or Ni and Co; a structurally integrated 'layered-spinel' (LS) lithium metal oxide such as $xLi_2MnO_3 \cdot (1-x)Li_2Mn_yM_{2-y}O_4$ wherein 0<x<1, 0≤y≤2, M=Ni, Co, or Ni and Co; a structurally integrated 'layered-layered-spinel' (LLS) lithium metal oxide such as $z[xLi_2MnO_3 \cdot Li_2Mn_yM_{2-y}O_4] \cdot (1-z)Li_2M'_2O_4$ wherein 0<x<1, 0≤y≤1, 0<z<1, M=Ni, Co, or Ni and Co, and M'=Mn, Ni, Co or a combination thereof (e.g., 0.85 $[0.25Li_2MnO_3 \cdot (0.75)LiMn_{0.375}Ni_{0.375}Co_{0.25}O_2] \cdot$ $0.15Li_2M'_2O_4$ wherein M'=a combination of Mn, Ni, and Co); $LiNi_{0.5}Mn_{1.5}O_4$ (LNMO), $LiMn_2O_4$ (LMO), $LiFePO_4$ (LFP), lithium nickel cobalt aluminum oxide (NCA), lithium nickel manganese aluminum oxide, lithium cobalt oxide (LCO), $Li_3V_2(PO_4)_3$, Li—S, or any other cathode active material used in lithium-ion batteries.

Typically, the nanofibers of the c-LLZO in the electrolyte and or cathode layers have a fiber diameter in the range of about 100 nm to about 10,000 nm. Fiber lengths for the c-LLZO nanofibers are in the range of about 5 μm to about 1 cm.

The concentration of c-LLZO nanofibers in the in the electrolyte layer is ≥55 wt %, e.g., about 55 to about 80 wt %. The polymer and lithium salt typically make up the remainder of the electrolyte layer, e.g., in a ratio of polymer to $Li^+$ of about 5:1 to 30:1 based on moles of monomer units in the polymer and moles of $Li^+$ in the lithium salt.

The concentration of c-LLZO nanofibers in the in the cathode layer, when present, typically is in the range of about 5 to 15 wt %, preferably about 5 to about 10 wt %. The concentration of cathode active nanofibers in the in the cathode layer, when present, typically is about 5 to about 15 wt % based on the total weight of the nanofibers, polymer and lithium salt. The concentration of cathode active particles in the cathode layer typically in the range of about 65 to 75 wt %, preferably about 70 to about 75 wt %. The concentration of carbon particles in the cathode layer typically in the range of about 5 to 15 wt %, preferably about 5 to about 7 wt %. The concentration of polymer in the cathode layer typically is in the range of about 3 to about 6 wt %.

Each layer of the electrochemical cell preferably has a thickness within the thickness ranges set forth in Table 1, below.

TABLE 1

Layer Thicknesses.

| Layer | Preferred Thickness | More Preferred Thickness |
|---|---|---|
| Anode Current Collector | 1 to 10 μm | 1 to 2 μm |
| Anode | 15 to 20 μm | 0 to 20 μm |
| First Interfacial Layer | 0.2 to 0.6 μm | 0.5 to 0.6 μm |
| Electrolyte | 2 to 50 μm | 5 to 10 μm |
| Second Interfacial Layer | 0.2 to 0.6 μm | 0.2 to 0.6 μm |
| Cathode | 100 to 200 μm | 50 to 150 μm |
| Cathode Current Collector | 1 to 10 μm | 1 to 2 μm |

As used herein, the terms "structurally-integrated" and "structurally-integrated composite" when used in relation to a lithium metal oxide a material refers to materials that include domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite lithium metal oxides are different from and generally have different properties than mere mixtures or combinations of two or more metal oxide components (for example, mere mixtures do not share a common oxygen lattice).

The polymeric matrix of the cathode and electrolyte layers can act as a binder to aid in adhering the electrode or electrolyte layers to one another and to other adjacent layers (e.g., the anode in the case of the electrolyte layer and the second current collector in the case of the cathode layer. Alternatively, or in addition, the various layers may utilize polymeric binders to aid in adhering the layers to each other, or in binding materials within layers. In some cases, the binder can comprise a poly(carboxylic acid) or a salt thereof (e.g., a lithium salt), which can be any poly(carboxylic acid), such as poly(acrylic acid) (PAA), poly(methacrylic acid), alginic acid, carboxymethylcellulose (CMC), poly(aspartic acid) (PAsp), poly(glutamic acid) (PGlu), copolymers comprising poly(acrylic acid) chains, poly(4-vinylbenzoic acid) (PV4BA), and the like, which is soluble in the electrode slurry solvent system. The poly(carboxylic acid) can have a $M_n$, as determined by GPC, in the range of about 1000 to about 450,000 Daltons (preferably about 50,000 to about 450,000 Daltons, e.g., about 130,000 Daltons). In some other embodiments, the binder may comprise anionic materials or neutral materials such as fluorinated polymer such as poly(vinylidene difluoride) (PVDF), carboxymethylcellulose (CMC), and the like.

The anode comprises a material capable of reversibly releasing and accepting lithium during discharging and charging of the electrochemical cell, respectively. Typically, the anode comprises lithium metal or another anode active material, such as a carbon material (e.g., graphite, graphene, carbon nanotubes, carbon nanofibers, and the like), a silicon-based material (e.g., silicon metal particles, a silicon nitride, a silicide, a silicon phosphide, a silicon alloy, a silicon-containing intermetallic compound, and the like), an anode active transition metal oxide, and the like. The anode layer is positioned between a current collector layer (e.g., copper foil) and the solid-state electrolyte layer, preferably with a polymer interface layer between the anode and the bulk core of the electrolyte layer. In the case of metallic lithium anodes, the lithium can be directly deposited on to the current collector, onto the solid-state electrolyte, or onto the interface layer, if present. Alternatively, the lithium anode layer can be formed in situ in an assembled battery precursor by electrochemical migration of lithium from a cathode active material having excess lithium). Optionally, anode active components can be mixed with a polymer binder such as PEO, PVDF, PC and PAN), e.g., in a solvent (e.g., acetonitrile), and the resulting mixture can be coated on the current collector (e.g., copper foil) or the solid-state electrolyte, and dried to remove solvent (if present), thereby forming an anode layer on the current collector or solid-state electrolyte.

The electrolyte salt can be any electrochemically stable lithium salt, which is dissolved or dispersed in the polymer matrix along with the LLZO nanofibers. Optionally, a non-aqueous organic solvent or a nonaqueous ionic liquid can be included in the electrolyte, e.g., as a plasticizer or to facilitate lithium exchange. Any lithium electrolyte salt can be utilized in the electrolyte compositions for lithium electrochemical cells and batteries described herein, such as the salts described in Jow et al. (Eds.), *Electrolytes for Lithium and Lithium-ion Batteries*; Chapter 1, pp. 1-92; Springer; New York, NY (2014), which is incorporated herein by reference in its entirety.

Non-limiting examples of electrochemically stable lithium salts include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, combinations of two or more thereof, and the like. The lithium salt can be present in the electrolyte solvent at any concentration suitable for lithium battery applications, which concentrations are well known in the secondary battery art. A preferred lithium salt is LTFSI.

Non-aqueous solvents suitable for inclusion in some embodiments of the electrolyte compositions (e.g., to form a gel) include the solvents described in Jow et al. (Eds.), *Electrolytes for Lithium and Lithium-ion Batteries*; Chapter 2, pp. 93-166; Springer; New York, NY (2014), which is incorporated herein by reference in its entirety. Non-limiting examples of solvents for use in the electrolytes include, e.g., an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds.

In some embodiments, the electrolyte can include an ionic liquid. Any electrochemically stable ionic liquid can be utilized in the electrolytes described herein, such as the ionic liquids described in Jow et al. (Eds.), *Electrolytes for Lithium and Lithium-ion Batteries*; Chapter 4, pp. 209-226; Springer; New York, NY (2014), which is incorporated herein by reference in its entirety. In the case of lithium electrochemical cells and batteries, the ionic liquid can optionally include a lithium cation, and can act directly as the electrolyte salt.

A battery can be formed by electrically connecting two or more such electrochemical cells in series, parallel, or a combination of series and parallel. Electrochemical cells and battery designs and configurations, anode and cathode materials, as well as electrolyte salts, solvents and other battery or electrode components that can be used in the electrolytes, cells and batteries described herein, are well known in the secondary battery art, e.g., as described in "Lithium Batteries Science and Technology" Gholam-Abbas Nazri and Gianfranco Pistoia, Eds., Springer Science+Business Media, LLC; New York, NY (2009), which is incorporated herein by reference in its entirety.

Figure 1:
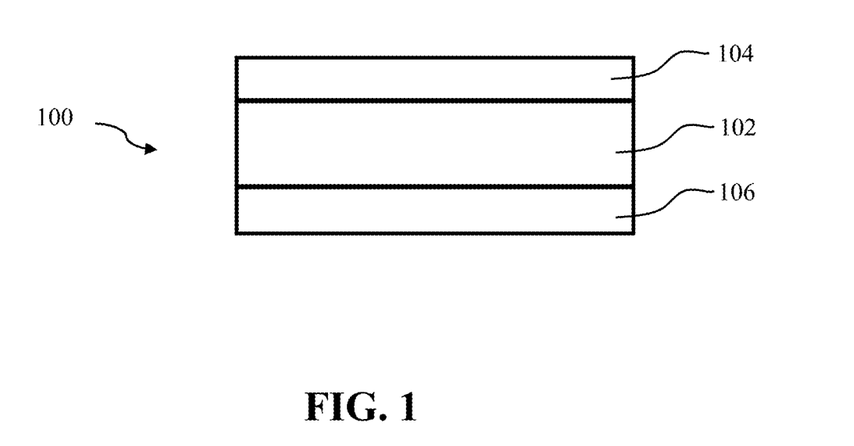
FIG. 1 provides a schematic illustration of the layer structure of an embodiment of a solid-state electrolyte as described herein.

FIG. 1 provides schematic illustrations of the layer structure of solid-state electrolyte layer described herein. Solid-state electrolyte 100 comprises a core layer 102 comprising c-LLZO nanofibers, a lithium electrolyte salt, and a polymer matrix. A first interfacial polymer layer 104 coats one surface core layer 102, while a second interfacial polymer layer 106 coats the other surface of core layer 102.

Figure 2:
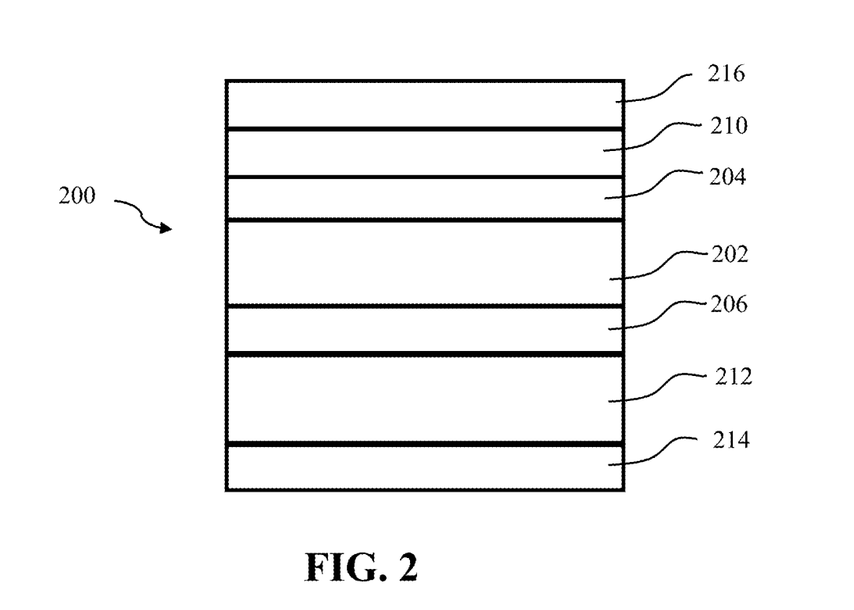
FIG. 2 provides a schematic illustration of the layer structure of an embodiment of a solid-state electrochemical cell as described herein.

FIG. 2 provides schematic illustrations of the layer structure of solid-state electrochemical cell described herein. Cell 200 comprises a core electrolyte layer 202 comprising c-LLZO nanofibers, a lithium electrolyte salt, and a polymer matrix. One surface of a first interfacial polymer layer 204 contacts a surface core layer 202, while one surface of a second interfacial layer 206 contacts the other surface of core layer 202. The other surface of first interfacial polymer layer contacts and is covered by anode layer 210 (e.g., metallic Li), which in turn contacts and is covered by anode current collector layer 216 (e.g., copper foil). The surface of second interfacial polymer layer 206 contacts and is covered by cathode layer 212 comprising a cathode active material, which in turn contacts and is covered by cathode current collector 214. The resulting assembly is a continuous multilayered sheet from which electrochemical cells can be die cut to a desired shape and desired dimensions.

Solid-state electrochemical cells typically are formed by well-known roll to roll (R2R) coating and lamination processes (e.g., extrusion coating, extrusion lamination, roll coating in which multiple layers of typically flexible materials are combined together to form a multilayer composite sheet material that comprises, in order from anode to cathode, a first current collector layer, an anode layer, an electrolyte layer, a cathode layer, and a second current collector layer. Electrodes for lithium solid-state electrochemical cells can be manufactured by many different processes. In some processes, layers are cast or roll-coated onto a moving web and then separated from the web and rolled for further processing. In some methods, more than one layer can be cast or coated at the same time. Various multilayer sheet materials can be bonded together by calendaring, pressing, or other such lamination processes to further build up the multilayer structure of the battery or various components of the battery, such as, e.g., the electrolyte or the cathode.

In extrusion coating, such as slot-die coating, a coating fluid is fed and extruded through a horizontal die head by pressure onto a moving web. If necessary, the resulting film or coating is run through a drying oven to remove any solvent that may be present in the coating fluid, finally resulting in a dry film, which can be either removed from the web and attach to the other battery components or permanently bonded to its neighbor layer if the web of substrate is made of the neighbor layer. In extrusion lamination a coating fluid, such as a melted thermoplastic resin is extruded between two substrate sheets, generally fed from two separate rolls, and the resulting film between the sheets acts as a bonding agent to form a multilayer sheet. Extrusion coating and extrusion lamination can be combined to form multilayered structures with many layers, such as the multilayer electrochemical cells described herein. Roll coating involves transfer of a coating fluid onto a web using one or more moving rollers that meter and transfer the fluid onto a moving web substrate. Roll coating methods include, e.g., gravure coating, offset gravure coating, reverse roll coating, knife coating, blade roll coating, chamber doctor coatings, and the like. The electrochemical cells and component substructure such as the solid-state electrolyte and cathode, for example, can be formed using a combination of such coating and lamination methods.

The c-LLZO nanofiber-PEO composite electrolyte layers described herein can be prepared using two scalable fabrication steps. The first step is to fabricate c-LLZO fibers using a high-yield R2R electrospinning followed by 750° C. thermal annealing. The obtained c-LLZO fibers are then integrated with PEO polymers through a R2R slot-die coating technology to form a thin, large-area composite membrane. Both R2R electrospinning and R2R slot-die coating were developed under DOE-AMO R2R Advanced Materials Manufacturing (AMM) consortium. During this process, LLZO fibers of a desired loading ratio are mixed with an electrolyte salt (e.g., LiTFSI)/PEO solution, and the well-dispersed slurry is then coated on a fast-moving web to form a thin membrane. By accurately controlling coating pressure and gap, as well as web moving speed, uniform membranes of designed thickness ($\leq 20$ μm) can be obtained. Interconnected LLZO nanofiber networks are the basis of the composite, with the polymer present within the fiber "scaffold" to increase flexibility and provide soft interfacial contacts for the anode and cathode. Both intrinsic $Li^+$ conductivity and nanowire morphology are desired for optimal performance. Thus, nanofiber distribution can be adjusted to form a good percolation network to achieve high room temperature conductivity. Numerous parameters in the composites can be adjusted to optimize $Li^+$ conductivity: LLZO loading and composition (undoped vs doped), nanofiber size and morphology, polymer selection, lithium salt-to-polymer ratio, and polymer molecular weight. Al-doped LLZO nanofiber/PEO/LiTFSI composites are one example of an electrolyte membrane/film as described herein, in which microstructure with respect to nanofiber loading and spatial distribution, coating defect control, and membrane thickness can be adjusted to achieve desired properties.

The solid-state electrochemical cells described herein provide a number of advantages over state-of-the-art cells. For example, aluminum doped $Li_7La_3Zr_2O_{12}$ (LLZO) nanofiber-polymer composite facilitates homogenous Li-ion flux distribution at the electrolyte/lithium interface and good wettability of polymer (PEO), which prevents dendrite growth in preliminary studies. In-situ electrochemical formation of ultrathin Li metal anode through Li-rich Ni—Mn—Co (NMC) cathode delithiation, reduces anode thickness and improve anode/electrolyte interface. The composite LLZO-NMC double fiber-NMC powder cathode enhances interparticle connectivity and cathode electronic and ionic conductivity. The LLZO fibers in the electrolyte and electrode serve as continuous Li-ion transport channels, improving charge/discharge rate. In addition, use of an ultrathin polymer interfacial layer minimizes or reduces reactions between electrolyte and electrodes.

The following non-limiting examples are provided to illustrate certain aspects and features of the materials and methods described herein.

EXAMPLE 1

Preparation of c-LLZO Nanofibers

Al-doped LLZO and undoped LLZO precursor nanofibers were synthesized by electrospinning and converted to c-LLZO nanofibers through thermal annealing at a temperature in the range of 600 to 800° C. in air or oxygen.

As a specific example of making the LLZO fibers, a solution of dimethylformamide (DMF) and acetic acid is prepared with a weight ratio of 85 wt % DMF to 15 wt % acetic acid. 7.7 mmol Lithium Nitrate, 3 mmol Lanthanum (III) Nitrate Hexahydrate, 2 mmol Zirconium(IV) Oxynitrate Hydrate are dissolved in this solution. This makes the first solution. A second solution that contains 10 wt % PVP in DMF is then prepared and mixed with the first solution with a 1:1 volume ratio. This gives the solution used for electrospinning of LLZO precursor nanofibers. During electrospinning, a number of syringes are loaded with the above solutions and connected to electrospinning tubing with needles. The solutions are pumped continuously from syringes to the needles with a flow rate between 0.1 mL/h to 10 mL/h. In the meantime, a high voltage in the range of 10-30 kV is applied to the needles to generate nanofibers and a grounded collector is used to collect the electrospun fibers. If Al-doped LLZO is targeted, an additional 0.2 mmol of aluminum nitrate nonahydrate can be added into the first solution. After electrospinning, the electrospun precursor fibers are annealed in air at 750° C. to form LLZO nanofibers.

Figure 3:
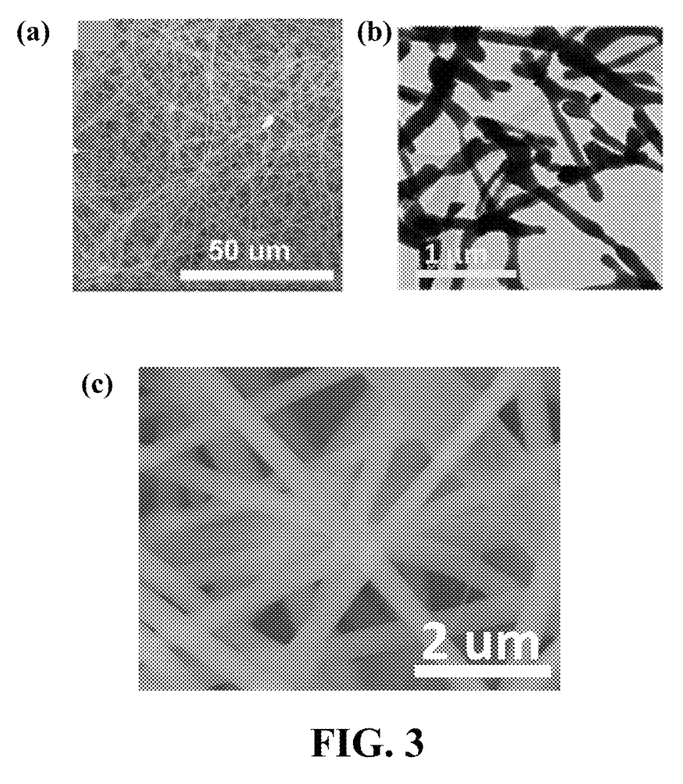
FIG. 3 provides (a) an electron micrographic image of as-spun polymer nanofiber precursors for LLZO; (b) oxide nanofibers formed by annealing the polymer nanofibers at 750° C.; and (c) an enlarged view of the precursor nanofibers showing an interconnected network of fibers with average fiber diameter of about 500 nm.
Figure 4:
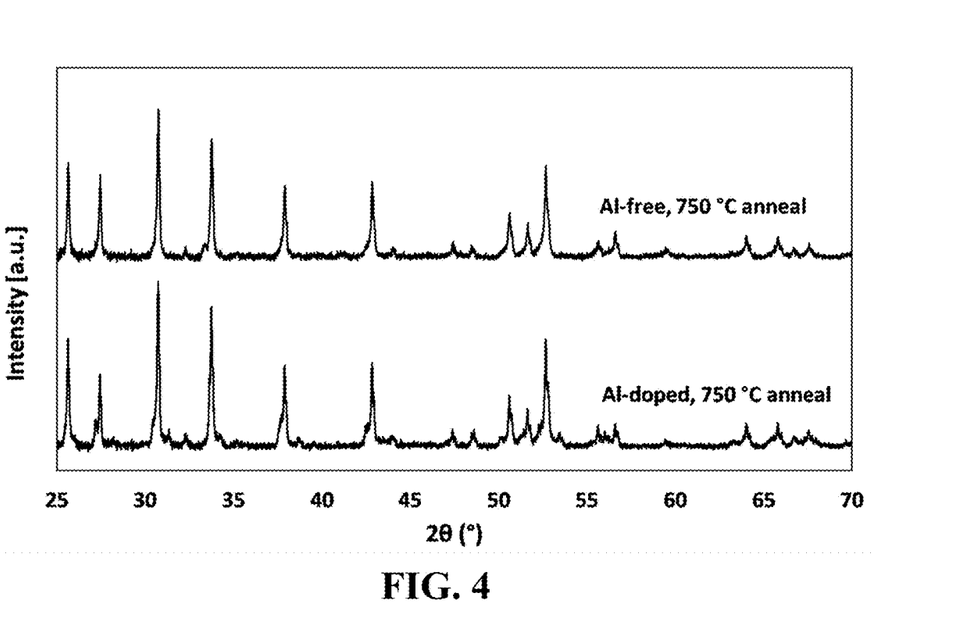
FIG. 4 provides X-ray diffraction (XRD) plots for Al-doped LLZO nanofibers and undoped LLZO nanofibers formed at a low (750° C.) annealing temperature showing that the material has a disordered cubic phase structure (c-LLZO).
Figure 5:
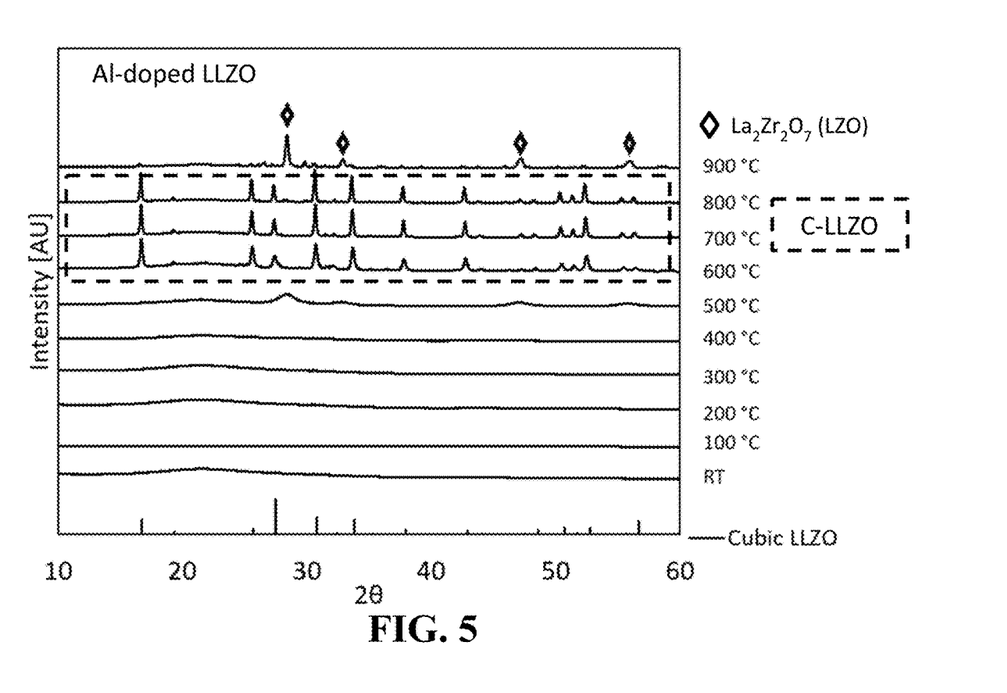
FIG. 5 provides an X-ray diffraction (XRD) plots for Al-doped LLZO formed at various annealing temperatures showing formation of a disordered cubic phase structure (c-LLZO) at annealing temperatures of 600 to 800° C.
Figure 6:
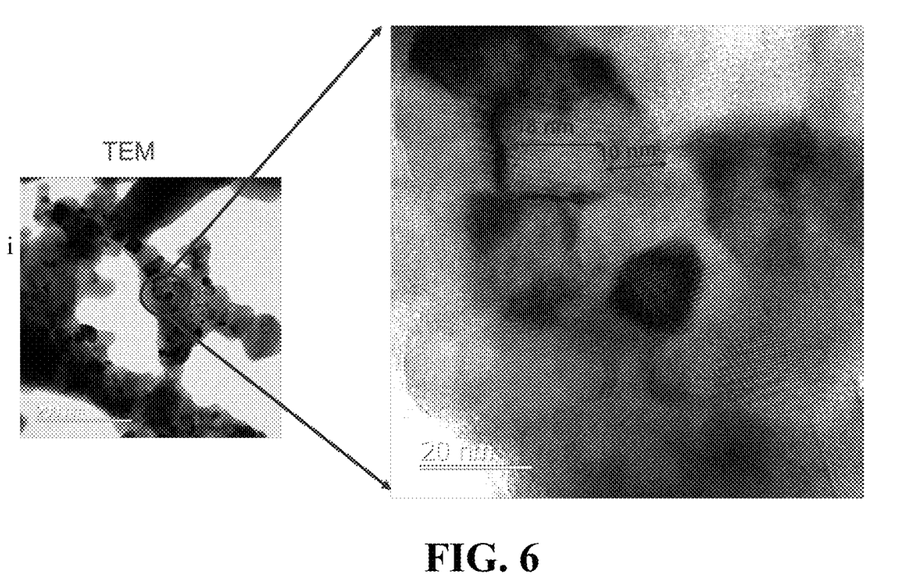
FIG. 6 provides TEM images indicating a grain size of less than 20 nm for 800° C. annealed LLZO nanofibers.

FIG. 3 provides an electron micrographic image of as-spun polymer/nanofiber precursors for the Al-doped LLZO in Panel (a). Panel (b) of FIG. 3 show an electron micrographic image of oxide nanofibers formed by annealing the polymer nanofibers at 750° C.; and Panel (c) provides an enlarged image of the precursor nanofibers showing an interconnected network of fibers with average fiber diameter of about 500 nm. X-ray diffraction (XRD) plots for Al-doped LLZO and Al-free LLZO nanofibers formed at 750° C. annealing temperature are shown in FIG. 4. In both cases, cubic crystal structure was formed, indicating that the electrospinning method described here is effective to generate desired cubic LLZO crystal phase. FIG. 5 shows X-ray diffraction (XRD) measured in situ during annealing of Al-doped LLZO-polymer precursor nanofibers at temperatures ranging from room temperature (no annealing) to 900° C. The plots show that c-LLZO nanofibers are formed at 600° C. and are stable at temperatures between 600 and 800° C. Above 850° C. the LLZO decomposed to $La_2Zr_2O_7$ (LZO). TEM images indicate a grain size of less than 20 nm for 800° C. annealed LLZO nanofibers (FIG. 6).

The nanofibers are about 200 to 300 nm in diameter and several micrometers in length. Both diameters and length can be adjusted by adjusting electrospinning recipes and process parameters. The individual fibers are polycrystalline, being composed of small grains of about 10 to 20 nm size that ensure a stabilized, more Li$^+$-conductive cubic phase. The long c-LLZO nanofibers can provide a continuous pathway for fast Li$^+$ transport.

EXAMPLE 2

Electrolyte Ink Formulation and Fabrication Process

Al-doped cubic $Li_7La_3Zr_2O_{12}$ nanofibers formed from electrospun polymer precursor fibers and annealing at 750° C. were formulated as follows:
PEO-LiTFSI-LLZO Ink Slurry Formulation.
PEO molecular weight: 600 kDa
Solvent: acetonitrile
Lithium Salt LiTFSI
EO:Li$^+$=15-20 (molar ratio)
LLZO:PEO=1:1.8 (mass ratio)
Total LLZO-PEO in slurry: 10.1 wt %

A mixture of c-LLZO nanofibers and LiTFSI was sonicated in acetonitrile for 30 minutes at ambient temperature. Dry PEO (600 kDa) polymer was added to the acetonitrile/c-LLZO/LiTFSI mixture and mix stirred until the PEO fully dissolved. The slurry was coated onto a glass substrate by slot-die coating with the wet film thickness of about 80-100 µm. The coating was dried at room temperature, leaving a dry electrolyte film of 50-60 µm. The film was then cut into circular shape for symmetric cell fabrication.

Figure 7:
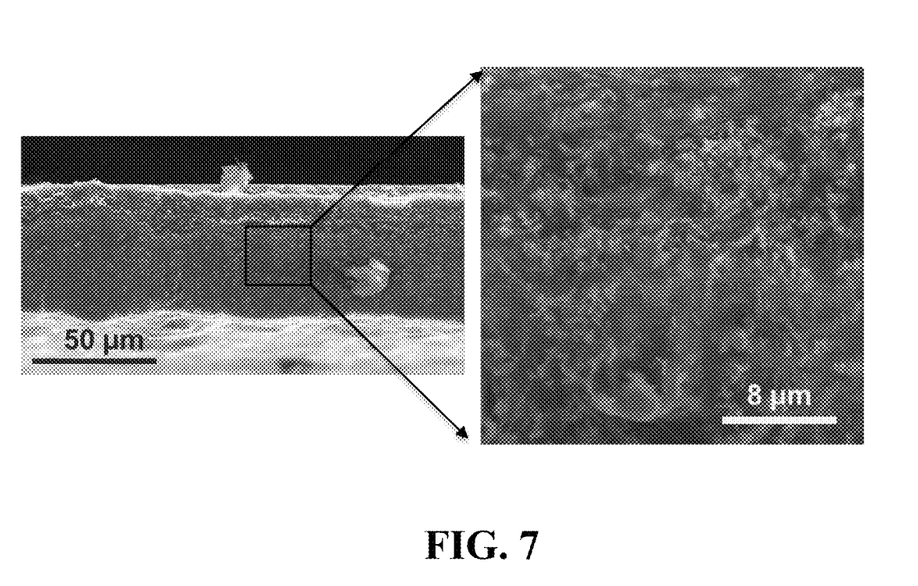
FIG. 7 provides scanning electron micrographic (SEM) images showing a cross-section of a symmetric Li/CPE/Li cell.

FIG. 7 provides scanning electron micrographic (SEM) images showing a cross-section of a dry CPE film, which shows relatively uniform nanofiber distribution across film thickness.

EXAMPLE 3

Electrochemical Evaluation of the Solid-State Electrolyte

A symmetric Li/SSE/Li cell was prepared from the electrolyte of Example 2 by assembly in a 2032 coin cell with 1.0 cm$^2$ lithium foil electrodes and stainless steel current collectors. The resulting cell was electrochemically evaluated by AC impedance and galvanostatic cycling. The resulting cell was evaluated by electrochemical impedance spectroscopy (EIS) and galvanostatic cycling. EIS was performed with an FRA module, with applied AC wave of amplitude 10 mV and frequency range of 1 Hz to 1 MHz. All electrochemical measurements were performed in a controlled temperature chamber at 60±0.5° C.

FIG. 8 provides graphs of cell cycling data for a symmetric cell comprising layers of lithium coated onto both surfaces of a solid-state electrolyte comprising 56 wt % Al-doped LLZO nanofibers and 44 wt % of LiTFSI/PEO. Panel (a) of FIG. 8 shows a plot of voltage versus time for charge-discharge cycling of the cell. The results indicate that cycling up to 3 mA/cm$^2$ and 3 mAh/cm$^2$ is possible for extended periods of time without dendrite formation and cell shorting. Panel (b) of FIG. 8 shows an AC impedance spectrogram. The results indicate that no shorting has taken place and interfacial/charge transfer resistance decreases over time as the Li fully wets the interface. Panel (c) of FIG. 8 shows a cross-section SEM image after cycling, which shows no dendrites have formed in the cycled cell and interfacial contact is optimal.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing materials or methods (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the materials or methods described herein and does not pose a limitation on the scope of the claims unless otherwise stated. No language in the specification should be construed as indicating any non-claimed element as essential to the practice of the claims.

Preferred embodiments are described herein, including the best mode known to the inventors for carrying out the claimed invention. Variations of those preferred embodiments may become apparent to those of ordinary skill in the art upon reading the foregoing description. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

The embodiments of the invention in which an exclusive property or privilege is claimed are defined as follows:

1. A multilayer solid-state electrochemical cell comprising a multilayer sheet in the following layer order, in the direction from anode to cathode:
   (a) an anode current collector layer;
   (b) an anode layer comprising an anode active material;
   (c) a solid-state electrolyte layer comprising a lithium electrolyte salt, at least about 55 wt % nanofibers of a first cubic phase lithium lanthanum zirconium oxide (c-LLZO), and a first polymer interspersed with the nanofibers and electrolyte salt; wherein the nanofibers of the first c-LLZO are interconnected in a three-dimensional network, and the lithium salt is present in a ratio of the polymer to $Li^+$ of about 5:1 to 30:1 based on moles of polymer monomer units and of $Li^+$;
   (d) a cathode layer comprising a cathode active material dispersed in a second polymer; and
   (e) a cathode current collector layer;
   wherein adjacent layers in the sheet contact each other and adhere together to form the solid-state electrochemical cell; and the cathode comprises nanofibers of the cathode active material; particles of the cathode active material; nanofibers of a second c-LLZO; and particles of a carbon material; all of which are dispersed in a polymeric matrix.

2. The electrochemical cell of claim 1, wherein the first c-LLZO is selected from the group consisting of an Al-doped cubic phase $Li_7La_3Zr_2O_{12}$, undoped cubic phase $Li_7La_3Zr_2O_{12}$, Ti-doped $Li_7La_3Zr_2O_{12}$, and Ga-doped $Li_7La_3Zr_2O_{12}$.

3. The electrochemical cell of claim 1, wherein the second c-LLZO is selected from the group consisting of an Al-doped cubic phase $Li_7La_3Zr_2O_{12}$, undoped cubic phase $Li_7La_3Zr_2O_{12}$, Ti-doped $Li_7La_3Zr_2O_{12}$, and Ga-doped $Li_7La_3Zr_2O_{12}$.

4. The electrochemical cell of claim 1, wherein the lithium electrolyte salt is selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, and a combination of two or more thereof.

5. The electrochemical cell of claim 1, wherein the first polymer is selected from the group consisting of PEO, PVDF, PMMA, PC, PAN, and CMC; and the second polymer is selected from the group consisting of PAN, PVDF, PMMA, and CMC.

6. The electrochemical cell of claim 1, wherein the cathode active material is selected from the group consisting of (a) $LiNi_xMn_yCo_zO_2$ (NMC) wherein x+y+z=1, 0<x<1, 0<y<1, and 0<z<1, (b) $LiNi_{0.5}Mn_{1.5}O_4$ (LNMO), (c) $LiMn_2O_4$ (LMO), (d) $LiFePO_4$ (LFP), (e) lithium nickel cobalt aluminum oxide (NCA), (f) lithium nickel manganese aluminum oxide, (g) lithium cobalt oxide (LCO), (h) $Li_3V_2(PO_4)_3$, and (i) Li-S.

7. The electrochemical cell of claim 1, further comprising a first interfacial polymer layer between the anode layer and the solid-state electrolyte layer; and a second interfacial polymer layer between the solid-state electrolyte layer and the cathode layer.

8. The electrochemical cell of claim 7, wherein the first interfacial polymer layer comprises PEO and the second interfacial polymer layer comprises PAN.

9. The electrochemical cell of claim 1, wherein the anode current collector layer comprises a copper foil or a carbon material selected from the group consisting of carbon nanofibers, graphite sheets, carbon paper, carbon nanotubes, and graphene; and the cathode current collector layer comprises an aluminum foil or a carbon material selected from the group consisting of carbon nanofibers, graphite sheets, carbon paper, carbon nanotubes, and graphene.

10. The electrochemical cell of claim 1, wherein the nanofibers of the first c-LLZO have a fiber diameter in the range of about 100 nm to about 10,000 nm.

11. The electrochemical cell of claim 1, wherein the nanofibers of c-LLZO are substantially evenly dispersed through the cathode, and the nanofibers of the cathode active material are asymmetrically dispersed within the cathode such that the concentration of the cathode active material is higher near one surface of the cathode and lower at an opposite surface of the cathode.

12. The electrochemical cell of claim 1, wherein the nanofibers of the cathode active material have a fiber diameter in the range of about 100 nm to about 10,000 nm.

* * * * *